US012027767B1

(12) United States Patent
Wilson et al.

(10) Patent No.: US 12,027,767 B1
(45) Date of Patent: Jul. 2, 2024

(54) ANTENNA MOVABLE BETWEEN DEPLOYED AND PARTIALLY STOWED POSITIONS AND ASSOCIATED METHODS

(71) Applicant: EAGLE TECHNOLOGY, LLC, Melbourne, FL (US)

(72) Inventors: Thomas Wilson, Malabar, FL (US); Crystal Wolfe, Palm Bay, FL (US); James Cornett, Melbourne, FL (US); John Evans, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 18/068,538

(22) Filed: Dec. 20, 2022

(51) Int. Cl.
*H01Q 15/16* (2006.01)
*H01Q 1/28* (2006.01)
*H01Q 19/12* (2006.01)

(52) U.S. Cl.
CPC ........... *H01Q 15/161* (2013.01); *H01Q 1/288* (2013.01); *H01Q 19/12* (2013.01)

(58) Field of Classification Search
CPC ........ H01Q 1/08; H01Q 1/288; H01Q 15/161; H01Q 19/12
See application file for complete search history.

(56) References Cited

U.S. PATENT DOCUMENTS 4,769,647 A * 9/1988 Herbig ................. H01Q 15/161 343/915
4,845,511 A * 7/1989 Grayson .............. H01Q 15/162 343/915
5,104,211 A * 4/1992 Schumacher ........... F24S 23/81 343/915
6,219,009 B1 * 4/2001 Shipley .................. H01Q 1/288 343/915
6,278,416 B1 8/2001 Harless
6,353,421 B1 * 3/2002 Lalezari ................. H01Q 1/288 343/915
11,139,549 B2 * 10/2021 Taylor .................. H01Q 15/161
2003/0201949 A1 10/2003 Harless
2006/0181788 A1 * 8/2006 Harada .................. H01Q 1/288 359/841

(Continued)

FOREIGN PATENT DOCUMENTS

JP S-60113503 A * 6/1985
WO WO-2001054228 A1 * 7/2001

*Primary Examiner* — Ab Salam Alkassim, Jr.
*Assistant Examiner* — Leah Rosenberg
(74) *Attorney, Agent, or Firm* — ALLEN, DYER, DOPPELT + GILCHRIST, P.A. Attorneys at Law

(57) ABSTRACT

An antenna may include rigid antenna ribs, a flexible antenna reflector layer, and a flexible support member extending behind the flexible antenna reflector layer between adjacent antenna ribs and having first and second sets of openings therein. A drawstring may extend through the first set of openings between adjacent ribs and a rear support cord is behind the flexible support member between adjacent ribs. Tie cords may extend between the flexible antenna reflector layer and the rear support cord and pass through respective ones of the second set of openings. A biasing member may maintain tension in the drawstring as adjacent antenna ribs move between first and second positions so that the flexible support member defines a pleated support body for the flexible antenna reflector layer.

24 Claims, 6 Drawing Sheets

(56) References Cited

U.S. PATENT DOCUMENTS

| | | | | |
|---|---|---|---|---|
| 2011/0187627 | A1* | 8/2011 | Palmer ................. | H01Q 15/161 343/915 |
| 2015/0288072 | A1* | 10/2015 | Medzmariashvili ......................... | H01Q 15/161 343/881 |
| 2019/0165481 | A1 | 5/2019 | Onishi et al. | |
| 2020/0153077 | A1 | 5/2020 | Taylor | |

* cited by examiner

ANTENNA MOVABLE BETWEEN DEPLOYED AND PARTIALLY STOWED POSITIONS AND ASSOCIATED METHODS

FIELD OF THE INVENTION

The present invention relates to the field of antennas, and, more particularly, to an antenna having a flexible antenna reflector layer supported by antenna ribs that are movable between deployed and partially stowed positions and related methods.

BACKGROUND OF THE INVENTION

An antenna that is configured to be mounted to a space vehicle, such as a satellite, usually includes a number of antenna ribs that support a flexible antenna reflector layer, such as a conductive mesh. The antenna is initially stowed, and when in orbit, the antenna is deployed from its stowed position. To ensure that the antenna is deployed in orbit without snagging and binding, great care is taken when initially stowing the antenna. These antennas usually include cords and ties that interconnect the flexible antenna reflector layer to the rigid antenna ribs and ensure that when the antenna is deployed, the proper antenna curvature, such as a parabolic configuration, is maintained. The antenna cords and ties are configured to ensure there is no snagging or binding when the antenna is deployed and ensure sufficient tension is imparted to the flexible antenna reflector layer to maintain not only the desired antenna configuration, but also maintain adequate antenna performance.

Many of these antenna unfortunately are not configured for stowing in orbit. Even a partial, in-orbit stow increases the chances that the antenna ties, cords, or reflector layer may entangle during redeployment. For example, if the antenna is partially stowed in orbit, and then redeployed, often one or more of the cords, ties or flexible antenna reflector layer may bind or "snag," making redeployment challenging. Even after redeployment, if only a small segment of the flexible antenna reflector layer is folded or snagged, that segment can create undesirable antenna performance, and may sometimes even render the antenna inoperable. There are therefore advantages in configuring an antenna that may be fully deployed, and later partially or fully stowed in orbit, and then successfully deployed again without bunching, entangling or snagging the ties, cords or flexible antenna reflector layer.

SUMMARY OF THE INVENTION

In general, an antenna may comprise a plurality of rigid antenna ribs, adjacent antenna ribs being relatively moveable between first and second positions, and a flexible antenna reflector layer. A flexible support member may extend behind the flexible antenna reflector layer between adjacent antenna ribs, the flexible support strip having first and second sets of openings therein. A drawstring may extend through the first set of openings in the flexible support member between adjacent ribs. A rear support cord may be behind the flexible support member between adjacent ribs. A plurality of tie cords may end between the flexible antenna reflector layer and the rear support cord and may pass through respective ones of the second set of openings in the flexible support member. A biasing member may maintain tension in the drawstring as adjacent antenna ribs move between the first and second positions so that the flexible support member defines a pleated support body for the flexible antenna reflector layer.

The adjacent antenna ribs may be movable to a fully stowed position. The first position may comprise a deployed position and the second position may comprise a partially stowed position. The first and second sets of openings may be arranged in an alternating pattern along the flexible support member. The flexible support member may comprise a flexible strip. The biasing member may comprise a constant force spring, for example.

The flexible antenna reflector layer may comprise a conductive mesh. The plurality of antenna ribs and flexible antenna reflector surface layer may define a parabolic antenna reflector surface. An antenna hub may pivotally mount the plurality of antenna ribs. An antenna feed may be associated with the flexible antenna reflector layer. The plurality of antenna ribs may be configured to be mounted to a space vehicle.

Another aspect is directed to a method for making an antenna. The method includes coupling a flexible support member extending behind a flexible antenna reflector layer between adjacent antenna ribs, the flexible support strip having first and second sets of openings therein and adjacent antenna ribs being relatively moveable between first and second positions. The method also includes coupling a drawstring extending through the first set of openings in the flexible support member between adjacent ribs and coupling a plurality of tie cords ending between the flexible antenna reflector layer and a rear support cord and passing through respective ones of the second set of openings in the flexible support member.

The method also includes coupling a biasing member for maintaining tension in the drawstring as adjacent antenna ribs move between the first and second positions so that the flexible support member defines a pleated support body for the flexible antenna reflector layer.

BRIEF DESCRIPTION OF THE DRAWINGS

Other objects, features and advantages of the present embodiments will become apparent from the detailed description which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein.

Rather, these embodiments are provided so that this disclosure will be thorough and complete. Like numbers refer to like elements throughout.

Figure 1:
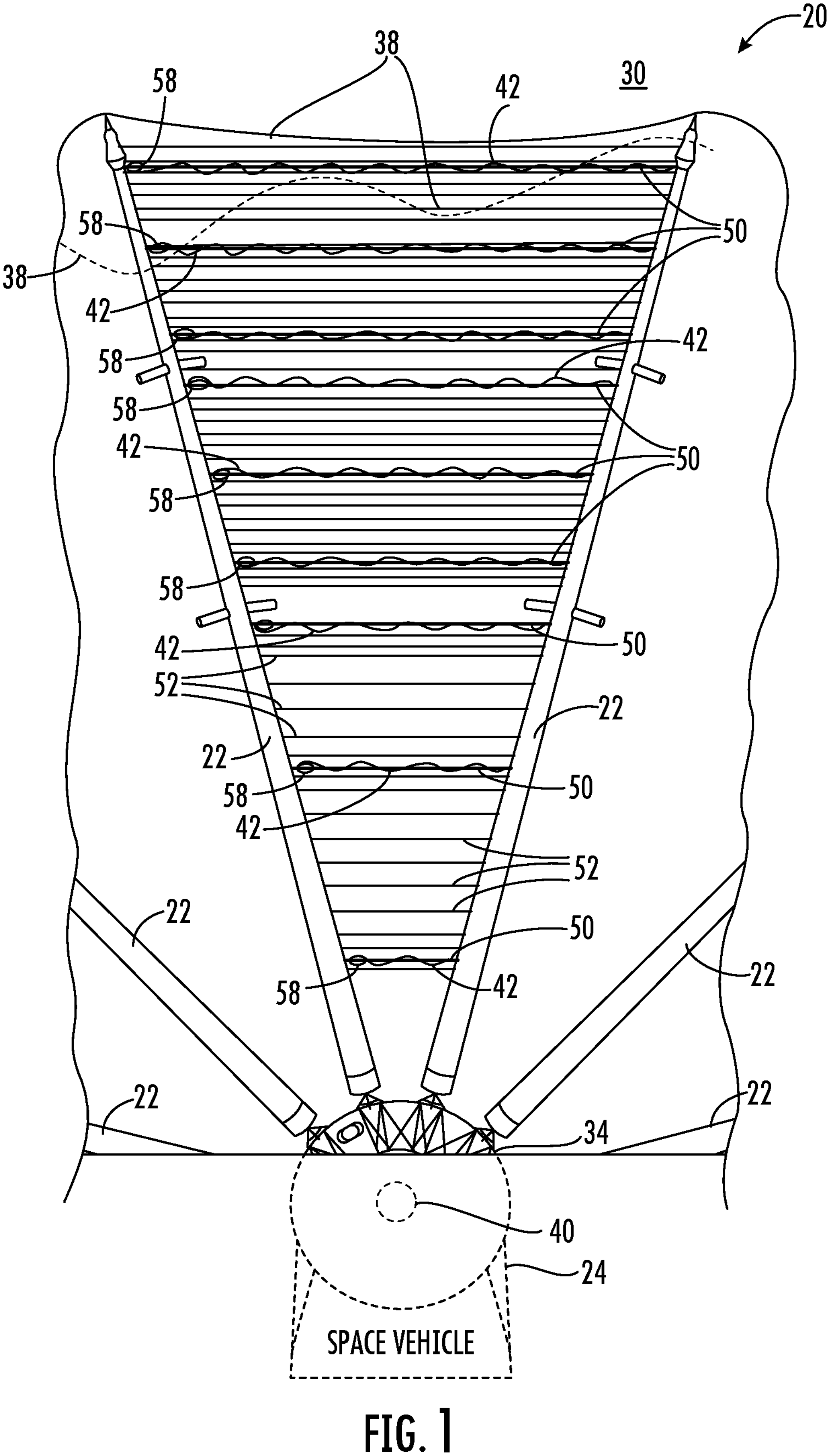
FIG. 1 is a partial plan view of the antenna in a deployed position showing the rigid antenna ribs, drawstring, flexible support member, and flexible antenna reflector layer.
Figure 2:
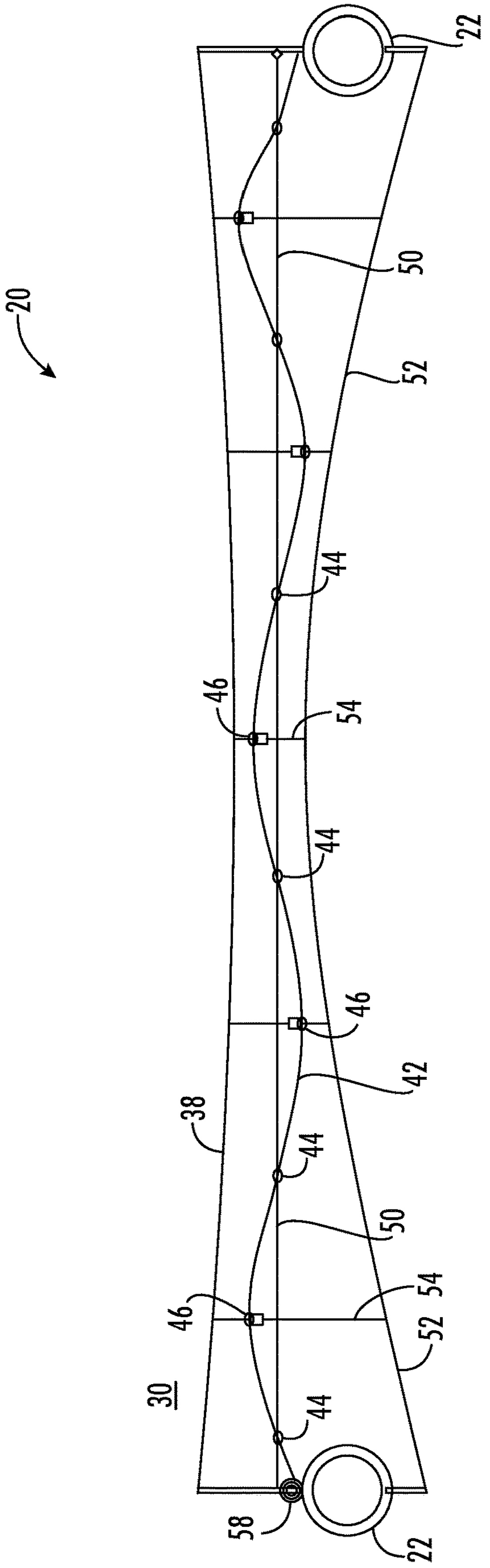
FIG. 2 is a partial schematic, sectional view of the antenna showing two adjacent ribs in their deployed position.
Figure 3:
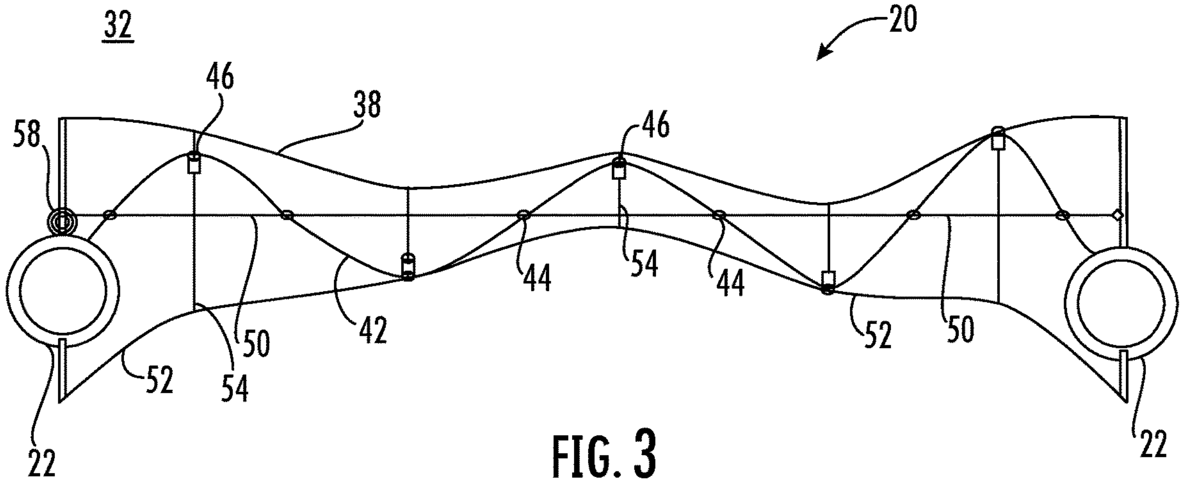
FIG. 3 is another schematic, sectional view of the antenna of FIG. 2 in an about 30% stowed position.
Figure 4:
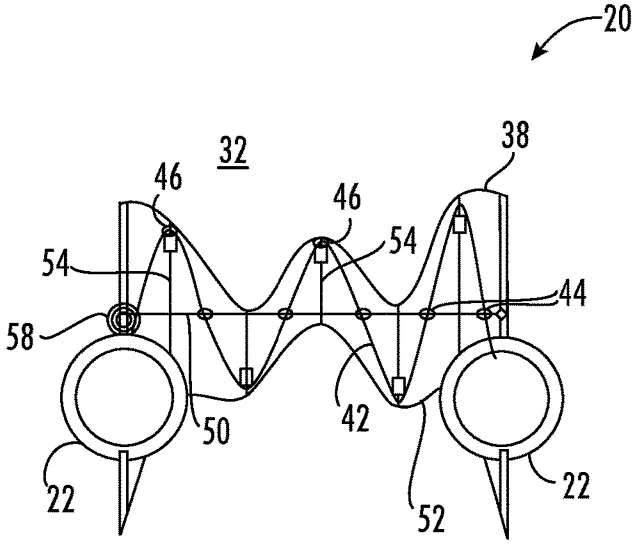
FIG. 4 is another schematic, sectional view of the antenna of FIG. 2 in an about 70% stowed position.

Referring now to FIGS. 1 and 2, an antenna is illustrated generally at 20 and includes a plurality of rigid antenna ribs 22 configured to be mounted to a rigid structure, bus, and/or space vehicle 24, and in this example, a satellite as illustrated by the dashed configuration in FIG. 1. Adjacent antenna ribs 22 are movable to a fully stowed position, such as when the space vehicle 24 as a satellite is launched into orbit. Adjacent antenna ribs 22 are also relatively movable between first and second positions, such as the first position corresponding to a deployed position 30 (FIGS. 1, 2 and 6), and a second position as a partially stowed position 32 (FIGS. 3 and 4). In this example, an antenna hub 34 pivotally mounts the plurality of rigid antenna ribs 22 and may be an integral part of or mounted to the space vehicle, such as the illustrated satellite 24.

Figure 6:
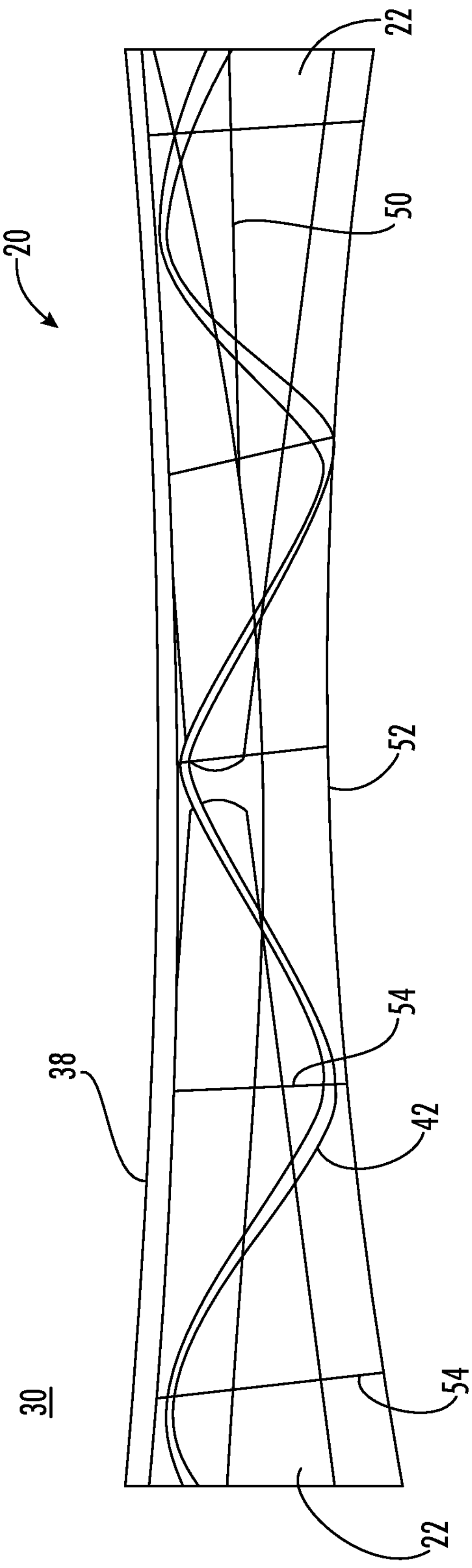
FIG. 6 is a partial side elevation image of the antenna showing two adjacent ribs in their deployed position.

A flexible antenna reflector layer 38, such as formed from a conductive mesh, is carried by the rigid antenna ribs 22, and in this example shown in FIGS. 2 and 6, defines a parabolic antenna reflector surface as shown by the parabolic curvature in those sectional views. In FIG. 1, the dashed line referenced at 38 defines a cut section of the flexible antenna reflector layer, which normally covers the entire surface area defined between the rigid antenna ribs 22. An antenna feed 40 as shown in FIG. 1 may be associated with the flexible antenna reflector layer 38 and include associated cabling or other interconnects that may interface to a transmitter or receiver carried by the space vehicle 24.

A flexible support member 42 formed as a flexible strip may extend behind the flexible antenna reflector layer 38 between adjacent antenna ribs 22 as best shown in FIGS. 2-4 and the side elevation image of FIG. 6, and include first and second sets of openings 44,46 therein (FIG. 2). A drawstring 50 extends through the first set of openings 44 in the flexible support member 42 between adjacent antenna ribs 22 and a rear support cord 52 is behind the flexible support member 42 between adjacent antenna ribs. In the example shown in FIG. 1, nine (9) parallel drawstrings 50 extend between the illustrated antenna ribs 22, and each drawstring includes an associated flexible strip 42. It should be understood that this number is dependent on many factors and may change based on additional development. A much larger number of rear support cords 52 extend between the antenna ribs 22 as shown in FIG. 1.

A plurality of tie cords 54 extend and end between the flexible antenna reflector layer 38 and the rear support cord 52 and pass through respective ones of the second set of openings 46 in the flexible support member 42 (FIG. 2). A biasing member 58, such as a constant force spring, maintains tension in the drawstring 50 as adjacent antenna ribs 22 move between the first and second positions 30,32 so that the flexible support member 42 defines a pleated support body for the flexible antenna reflector layer 38. In an example, the first and second sets of openings 44,46 are arranged in an alternating pattern along the flexible support member 42, which in this example is formed as a flexible strip. These openings 44,46 may be different in length (separation) from each other depending on the amplitudes of the flexible support member 42 and geometries of the rear support cords 52.

The flexible antenna reflector layer 38 (the conductive mesh) is pleated by the flexible strip 42 as the adjacent antenna ribs 22 are moved into the second position 32 corresponding to the partially stowed position as shown in FIGS. 3 and 4. The flexible strips 42 create a series of parabolic curve sections that are constrained by the existing rear support cords 52 and plurality of tie cords 54 that extend and end between the flexible antenna reflector layer 38 and the rear support cords to assist in managing the rear support cords, tie cords, and flexible antenna reflector layer during stow and deploy operations.

The kinematic movement of the rigid antenna ribs 22 while stowing in orbit may disrupt the curvature and tension of the flexible antenna reflector layer 38. The flexible strip 42 may introduce a new parabolic shape. The flexible strip 42 may be formed of a material to impart the parabolic shape and have some material memory. The flexible strip 42 also may have different amplitudes between the crest and trough and may be dependent upon the distance between the flexible antenna reflector layer as the conductive mesh 38 and the rear support cords 52. The flexible support member 42 in the example of FIG. 2 is shown in one configuration based upon one rear support cord 52 geometry. However, the amplitudes of the flexible support member 42 may increase or decrease depending on the curvature of the rear support cords 52. Each drawstring 50 is held constantly taut by its biasing member 58 that maintains tension in the drawstring as adjacent antenna ribs 22 move between the first and second positions 30,32 so that the flexible support member 42 defines a pleated support body for the flexible antenna reflector layer 38.

The drawstring 50 extends through the first set of openings 44 in the flexible support member 42 between adjacent antenna ribs 22. The drawstring 50 cooperates with the plurality of tie cords 54 that extend and end between the flexible antenna reflector layer 38 and rear support cord 52 and passes through respective ones of the second set of openings 46 in the flexible support member 42. As the drawstring 50 is held constantly taut by the biasing member 58, the distance between where the drawstring 50 enters and exits the flexible strip 42 develops a unique "pleating" result that occurs naturally to match the excess length of the rear support cord 52 and flexible antenna reflector layer 38 as a conductive mesh that is managed during partial stowing of the antenna 20 in orbit.

In the example of the antenna 20 shown in FIG. 1, rear support cords 52 are spaced along the adjacent antenna ribs 22. The drawstrings 50 and flexible support members 42 as the flexible strips are placed in this example between about every fourth to sixth rear support cord 52 depending on the configuration of the antenna 20 and how much control the rear support cords 52 and flexible antenna reflector layer 38 require in management during the stowing and deployment operation.

The length of the flexible strip 42, the number of periods, amplitudes, and tie cord 54 spacing (FIG. 2) is dependent upon the distance between the adjacent antenna ribs 22 and the number of rear support cords 52 and the shape of the antenna 20. The drawstring 50 constrains the flexible strip 42 along a single axis to prevent buckling, twisting and/or snagging during stowing and deployment operations of the antenna 20.

Figure 5:
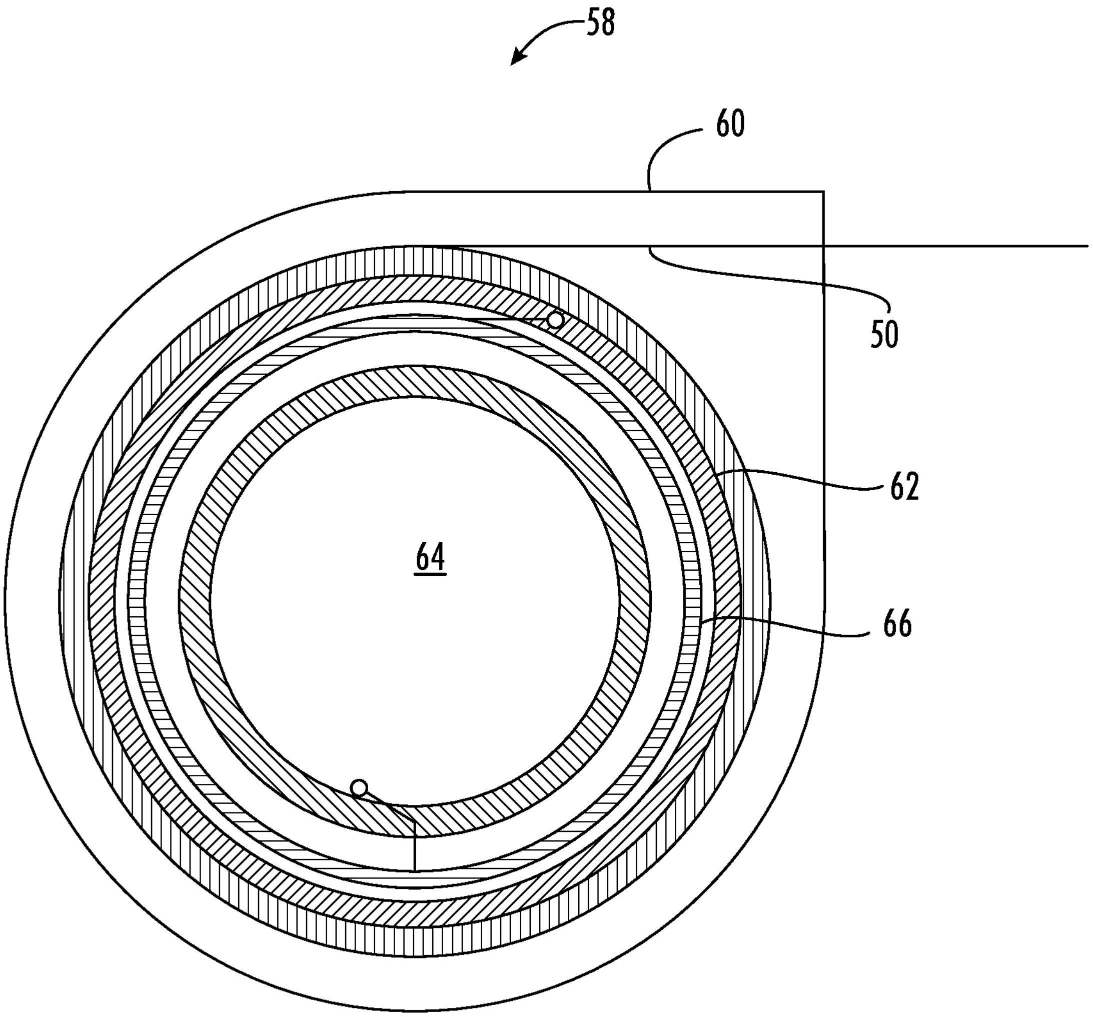
FIG. 5 is a schematic diagram of an example biasing member using a constant force spring.

As noted before, the biasing member 58 may be formed as a constant force spring and maintains the tension in the drawstring 50 as adjacent antenna ribs 22 move between the first and second positions 30,32 so that the flexible support member as the flexible strip 42 defines a pleated support body for the flexible antenna reflector layer 38. In the example of the schematic diagram of the biasing member 58 of FIG. 5, a biasing member housing 60 supports a spool 62 with the drawstring 50 wrapped around the spool and contained within the biasing member housing. The spool 62 is carried by a support shaft 64 and a constant force spring 66 has one end attached to the support shaft 64, and the other end attached to the spool 62 to maintain constant tension on the drawstring 50. In this example, the biasing member 58 formed with the constant force spring 66 may be configured as a 1:1 system where the length of the constant force spring is equal to the length of the drawstring 50 to be stored.

Each drawstring 50 includes an associated biasing member 58 connected to the drawstring 50 (FIG. 1). In the example of FIG. 1, nine biasing members 58 are connected to the nine drawstrings 50. Although not illustrated, it is also possible to use a geared spring real that incorporates a shaft and a constant force spring 66 that is attached to a gear contained within a housing and a spool carried by another shaft. The drawstring 50 is wrapped around the spool carried by the second shaft. This second type of system could be a 3:1 system where the length of a constant force spring 66 is one-third of the length of the drawstring 50 to be stored. This differentiator is important because due to weight constraints or physical properties of the constant force spring 66, the overall length may be limited in size and may not be able to extend all the way across the panel defined by the flexible antenna reflector layer 38 to the other adjacent antenna rib 22 towards the outboard portions of the flexible antenna reflector layer.

The antenna 20 achieves a "hands-off," in orbit stow and deploy process. The flexible antenna reflector layer as a conductive mesh 38 in an example may be pleated successfully without tangling, and the rear support cords 52 and tie cords 54 successfully managed not only during stowing of as much as 70%-90% of the antenna 20, but also during a redeployment cycle. This configuration allows the antenna 20 to be more resilient in operation during specific mission scenarios and overcomes the technical drawbacks with current deployable conductive mesh and reflector antenna technologies.

Figure 7:
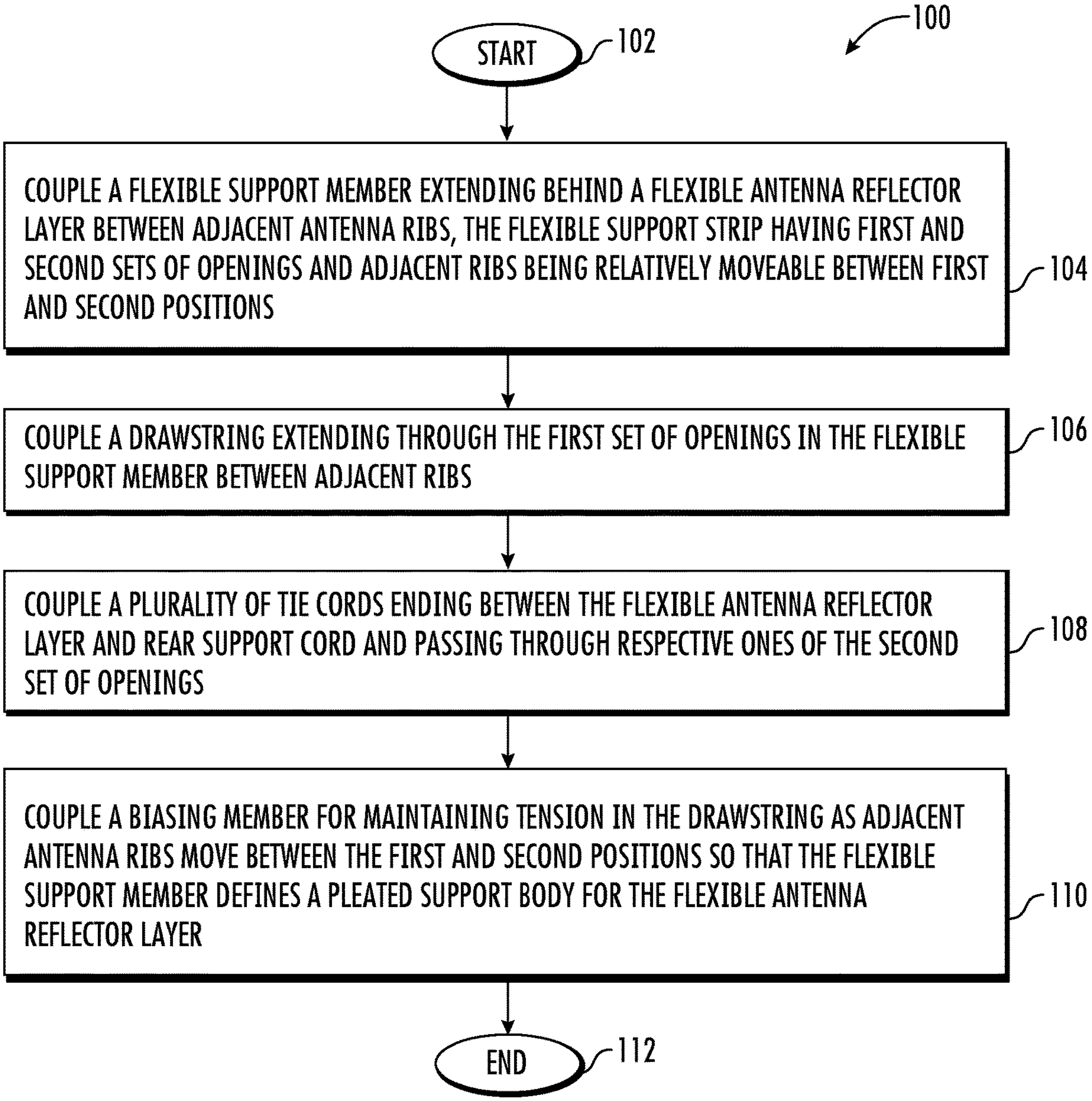
FIG. 7 is a high-level flowchart of a method for making the antenna of FIG. 1.

The antenna 20 also minimizes and alleviates the requirement for adaptation of numerous types of stowage devices to organize and stow the various components of the antenna, including the flexible antenna reflector layer as the example conductive mesh 38. Different manufacturing techniques may be used and an example is shown in the high-level flowchart of FIG. 7. A method for making the antenna 20 is illustrated generally at 100.

The process starts (Block 102) and the flexible support member 42 as the flexible strip that extends behind a flexible antenna reflector layer 38 is coupled between adjacent antenna ribs 22. This flexible strip 42 has first and second sets of openings 44,46 and adjacent antenna ribs 22 are relatively movable between first and second positions 30,32 (Block 104). The drawstring 50 that extends through the first set of openings 44 in the flexible support member 42 is coupled between adjacent antenna ribs 22 (Block 106). The method also includes coupling a plurality of tie cords 54 ending between the flexible antenna reflector layer 38 and the rear support cord 52 and passing through respective ones of the second set of openings 46 (Block 108). The process further includes coupling a biasing member 58 for maintaining tension in the drawstring 50 as adjacent antenna ribs 22 move between the first and second positions 30,32 so that the flexible support member 42 defines a pleated support body for the flexible antenna reflector layer 38 (Block 110). The process ends (Block 112).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. An antenna comprising:

a plurality of rigid antenna ribs, adjacent antenna ribs being relatively moveable between first and second positions;

a flexible antenna reflector layer;

a flexible support member extending behind the flexible antenna reflector layer between adjacent antenna ribs, the flexible support member having first and second sets of openings therein;

a drawstring extending through the first set of openings in the flexible support member between adjacent ribs;

a rear support cord behind the flexible support member between adjacent ribs;

a plurality of tie cords ending between the flexible antenna reflector layer and the rear support cord and passing through respective ones of the second set of openings in the flexible support member; and a biasing member for maintaining tension in the drawstring as adjacent antenna ribs move between the first and second positions so that the flexible support member defines a pleated support body for the flexible antenna reflector layer.

2. The antenna of claim 1 wherein the adjacent antenna ribs are movable to a fully stowed position; and wherein the first position comprises a deployed position and the second position comprises a partially stowed position.

3. The antenna of claim 1 wherein the first and second sets of openings are arranged in an alternating pattern along the flexible support member.

4. The antenna of claim 1 wherein the flexible support member comprises a flexible strip.

5. The antenna of claim 1 wherein the biasing member comprises a constant force spring.

6. The antenna of claim 1 wherein the flexible antenna reflector layer comprises a conductive mesh.

7. The antenna of claim 1 wherein the plurality of antenna ribs and flexible antenna reflector layer define a parabolic antenna reflector surface.

8. The antenna of claim 1 comprising an antenna hub pivotally mounting the plurality of antenna ribs.

9. The antenna of claim 1 comprising an antenna feed associated with the flexible antenna reflector layer.

10. The antenna of claim 1 wherein the plurality of antenna ribs are configured to be mounted to a space vehicle.

11. An antenna for a space vehicle comprising:

a plurality of rigid antenna ribs configured to be mounted to the space vehicle, adjacent antenna ribs being relatively moveable between first and second positions;

a flexible antenna reflector layer;

a flexible support member extending behind the flexible antenna reflector layer between adjacent antenna ribs, the flexible support member having first and second sets of openings therein arranged in an alternating pattern along the flexible support member;

a drawstring extending through the first set of openings in the flexible support member between adjacent ribs;

a rear support cord behind the flexible support member between adjacent ribs;

a plurality of tie cords ending between the flexible antenna reflector layer and the rear support cord and passing through respective ones of the second set of openings in the flexible support member; and a biasing member for maintaining tension in the drawstring as adjacent antenna ribs move between the first and second positions so that the flexible support member defines a pleated support body for the flexible antenna reflector layer.

12. The antenna of claim 11 wherein the adjacent antenna ribs are movable to a fully stowed position; and wherein the first position comprises a deployed position and the second position comprises a partially stowed position.

13. The antenna of claim 11 wherein the flexible support member comprises a flexible strip.

14. The antenna of claim 11 wherein the biasing member comprises a constant force spring.

15. The antenna of claim 11 wherein the flexible antenna reflector layer comprises a conductive mesh.

16. The antenna of claim 11 wherein the plurality of antenna ribs and flexible antenna reflector layer define a parabolic antenna reflector surface.

17. The antenna of claim 11 comprising an antenna hub pivotally mounting the plurality of antenna ribs.

18. A method for making an antenna comprising:

coupling a flexible support member extending behind a flexible antenna reflector layer between adjacent antenna ribs, the flexible support member having first and second sets of openings therein and adjacent antenna ribs being relatively moveable between first and second positions;

coupling a drawstring extending through the first set of openings in the flexible support member between adjacent ribs;

coupling a plurality of tie cords ending between the flexible antenna reflector layer and a rear support cord and passing through respective ones of the second set of openings in the flexible support member; and coupling a biasing member for maintaining tension in the drawstring as adjacent antenna ribs move between the first and second positions so that the flexible support member defines a pleated support body for the flexible antenna reflector layer.

19. The method of claim 18 wherein the adjacent antenna ribs are movable to a fully stowed position; and wherein the first position comprises a deployed position and the second position comprises a partially stowed position.

20. The method of claim 18 wherein the first and second sets of openings are arranged in an alternating pattern along the flexible support member.

21. The method of claim 18 wherein the flexible support member comprises a flexible strip.

22. The method of claim 18 wherein the biasing member comprises a constant force spring.

23. The method of claim 18 wherein the flexible antenna reflector layer comprises a conductive mesh.

24. The method of claim 18 comprising mounting the plurality of antenna ribs to a space vehicle.

* * * * *